June 13, 1961 R. A. FISHER 2,988,256
MEASURING DEVICE
Filed Nov. 25, 1957 5 Sheets-Sheet 1

INVENTOR
Richard A. Fisher
BY Robert M. Dunning
ATTORNEY

June 13, 1961 R. A. FISHER 2,988,256
MEASURING DEVICE
Filed Nov. 25, 1957 5 Sheets-Sheet 3

INVENTOR
Richard A. Fisher
BY Robert M. Dunning
ATTORNEY

June 13, 1961 R. A. FISHER 2,988,256
MEASURING DEVICE
Filed Nov. 25, 1957 5 Sheets-Sheet 4

INVENTOR
Richard A. Fisher
BY
ATTORNEY

United States Patent Office 2,988,256
Patented June 13, 1961

2,988,256
MEASURING DEVICE
Richard A. Fisher, Minneapolis, Minn., assignor to The
United States Bedding Co., Ramsey County, Minn., a
corporation of Minnesota
Filed Nov. 25, 1957, Ser. No. 698,536
10 Claims. (Cl. 226—136)

This invention relates to an improvement in measuring devices and deals particularly with an apparatus which may be used to move a web of material and stop the web at predetermined intervals.

In the production of various articles it has been found desirable to move the web for a predetermined distance, and to interrupt the movement of the web at a predetermined point so that some operation may be performed on the web while it is stationary. For example, in the production of mattress side walls, it is common practice to attach handles to the side walls at predetermined intervals. These handles are usually attached to the web forming the side wall before this web is attached to the remainder of the mattress. Two such handles are usually provided on each side of the mattress so that the distance between the handles varies longitudinally of the web. Such handles usually include grommets or other fastening means which extend through the side wall. The present apparatus is capable of moving the web which is to form the mattress side wall through a predetermined distance and automatically stops the web for a first operation such as the insertion of a first grommet through the mattress wall. The apparatus then may function to move the web a short distance so that a second grommet may be inserted through the mattress wall. The device may then move the web the distance between handles on one side of the mattress wall and may stop the web for a third operation. These operations can continue until they have all been completed and the handles are in place.

A feature of the present invention resides in the simplicity with which the measuring device may be adjusted to regulate the distance between stops. In preferred form, the apparatus includes a block longitudinally movable upon a threaded shaft. The shaft may be rotated selectively in either direction to move the block longitudinally thereof. The block carries switches or switch actuating means engageable with spaced stops mounted on a support extending parallel to the threaded shaft. These stops are adjustable in position and function to stop the operating motor at suitable intervals. A conveyor is actuated by the drive motor and the conveyor moves the web a predetermined position depending upon the position of the adjustable stops.

A further feature of the present invention resides in the provision of a measuring device which is operated by a single drive motor. This motor operates the threaded shaft selectively in either direction. This motor operates through an overrunning clutch to drive the conveyor in one direction only. Thus, while the threaded shaft is being reversed to return the switch carriage to starting position the conveyor remains stationary.

A further feature of the present invention resides in the provision of an apparatus which is capable of stopping a movable web at a considerable number of locations and which may be preset to stop the web at different locations without the requirement of making adjustments between times. In other words, the apparatus may be preset to operate properly upon webs of different lengths if and when it is desired. The apparatus includes a carriage supporting a series of parallel adjustment rods, each of which may serve to support a different series of stop lugs. When one of these parallel shafts is properly related to the threaded shaft, the apparatus will stop at one series of locations. If another shaft of the series is moved into proper relation to the threaded shaft, the machine will function to stop at a different series of locations. Thus, once the stop lugs have been properly positioned on their respective shafts, the device may be quickly arranged to stop at the desired intervals when used on webs of different lengths or different styles.

These and other objects and novel features of the present invention will be more clearly and fully set forth in the following specification and claims.

In the drawings forming a part of the specification:

Figure 1:
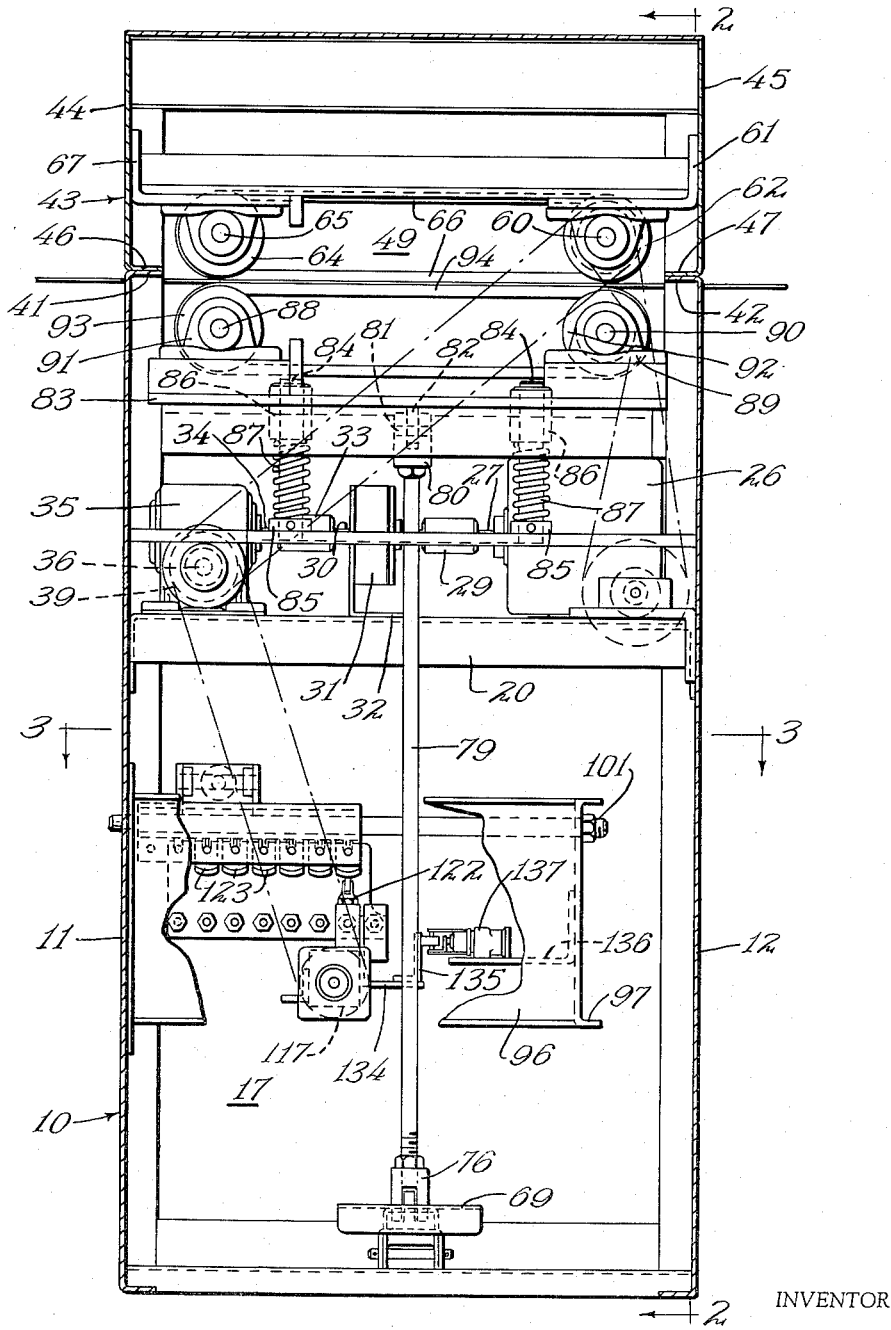
FIGURE 1 is a vertical sectional view through the forward part of the enclosing cabinet, portions of the structure being broken away to more clearly illustrate inner portions thereof.

In the drawings, certain of the parts have been shown more or less diagrammatically in order that the operation of the apparatus may be readily described. The apparatus is mounted in a housing indicated in general by the numeral 10 and including in general a pair of parallel side wall panels 11 and 12 having inturned flanges 13 and 14 at their rear edges respectively and having inturned flanges 15 and 16 at their forward edges. A back wall panel 17 connects the inturned flanges 13 and 14 and are secured thereto by any suitable means such as the metal screws or bolts 19. The side walls 11 and 12 are connected and held in spaced relation by an inverted channel-shaped shelf 20 which includes mounting plates 21 which are attached to the walls 11 and 12 respectively. The forward portions of the walls 11 and 12 are connected by a cross member 22 and by channels 23 and 24, the first of which extends across the cabinet near the upper ends of the walls, and the second of which connects the lower ends of the walls at the forward edge thereof. A channel 25 also acts to connect the walls 11 and 12 at the bottom thereof.

As is best indicated in FIGURE 1 of the drawings, a motor 26 is mounted upon the shelf 20 and its motor shaft 27 is connected by a flexible coupler 29 to the shaft 30 of an electrical brake 31 supported by a suitable bracket 32 attached to the shelf 20. The brake shaft 30 is connected by a suitable coupler 33 to the shaft 34 of a gear reduction unit 35. This gear reduction unit 35 includes an output shaft 36 upon which are mounted a pair of pulleys or sprockets 37 and 39.

Figure 2:
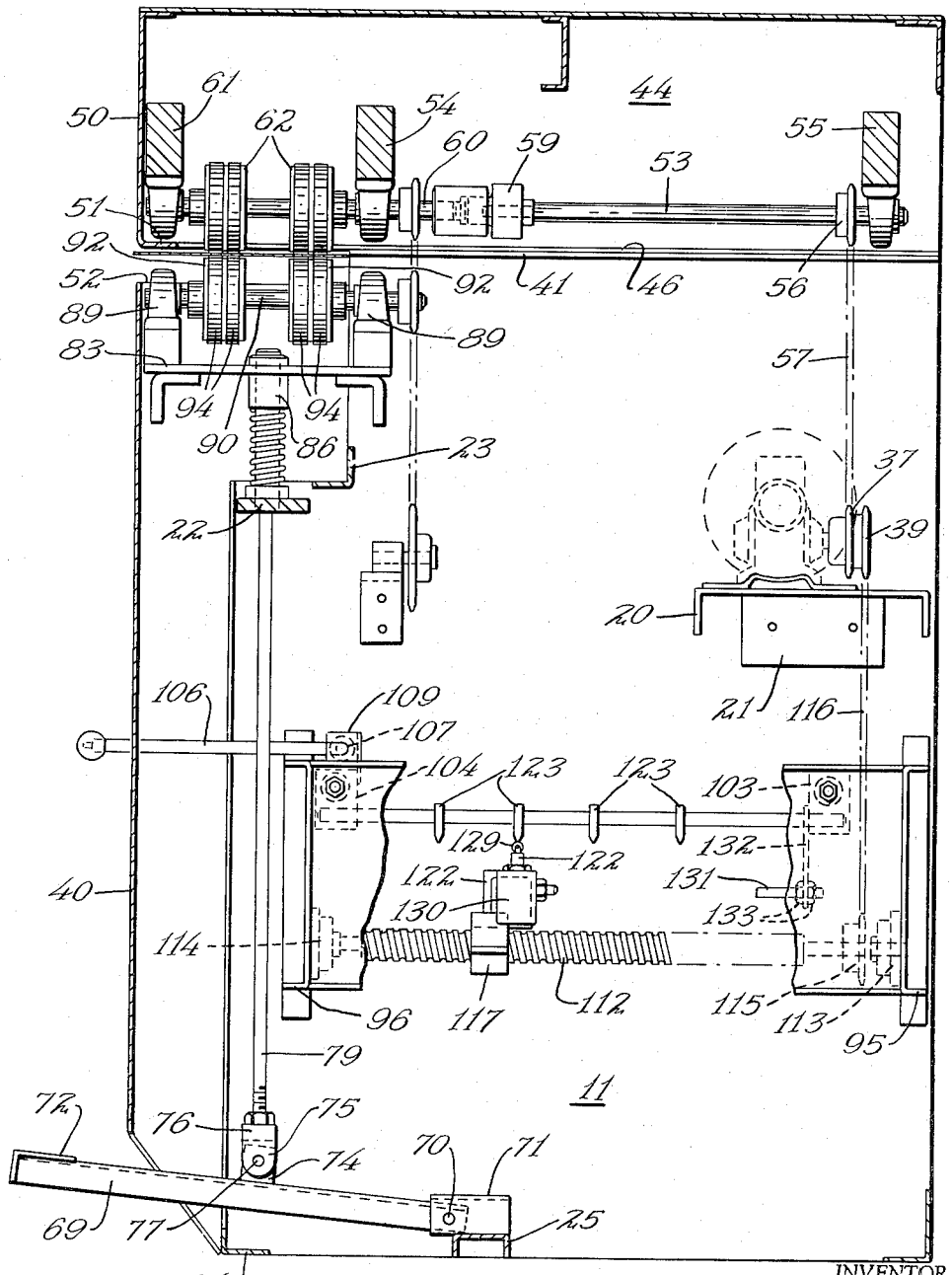
FIGURE 2 is a diagrammatic sectional view just inside one of the side walls of the cabinet, the position being indicated by the line 2—2 of FIGURE 1 and portions of the structure being broken away to disclose the interior thereof.
Figure 3:
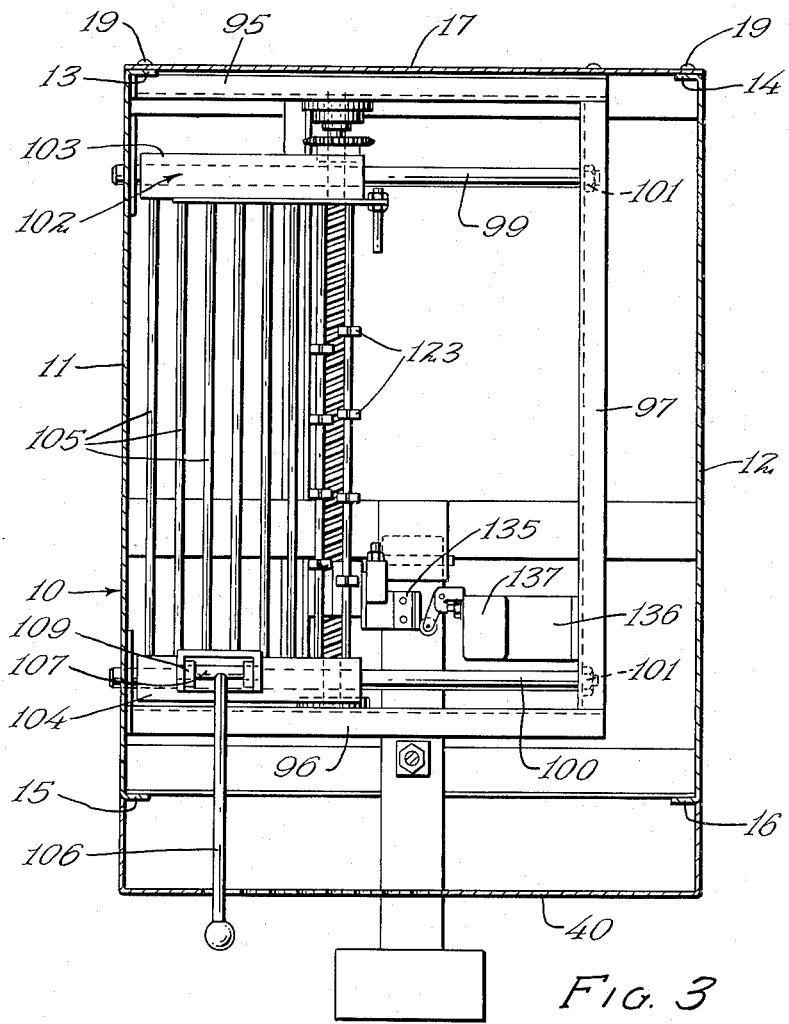
FIGURE 3 is a horizontal section through the apparatus, the position of the section being indicated by the line 3—3 of FIGURE 1.
Figure 4:
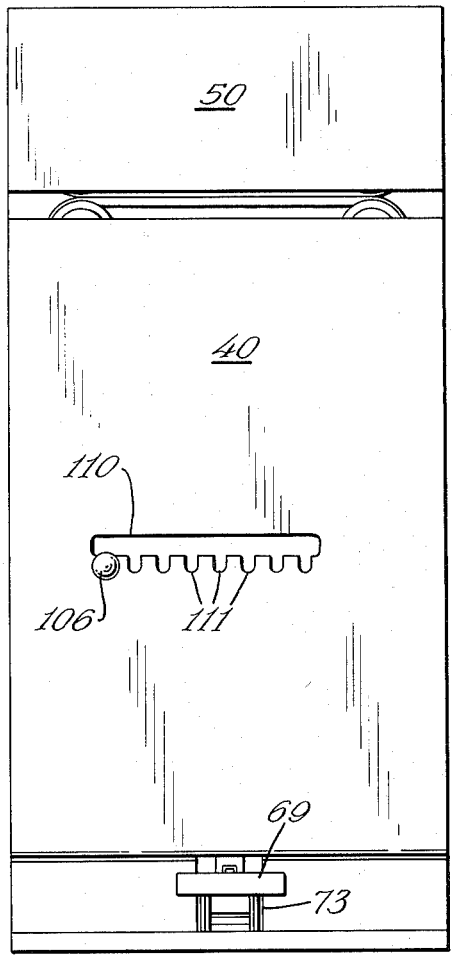
FIGURE 4 is a front elevational view of the apparatus in readiness for operation.

As is indicated in FIGURES 2 and 4 of the drawings, the front of the cabinet is normally closed by a removable cover element 40 which terminates short of the inturned flanges 41 and 42 which are provided at the upper edges of the side walls 11 and 12. A box like cabinet section 43 is mounted upon the cabinet 10 and forms a continuation thereof. The cabinet section 43 includes side walls 44 and 45 having inturned flanges 46 and 47 along their lower edges which rest upon the flanges 41 and 42 and are supported thereby. The cabinet section 43 also includes a rear panel 49 and a front wall panel 50 which includes an inturned flange 51 on the plane of the side wall flanges 46 and 47. The forward edges of the side walls 11 and 12 are notched as indicated at 52 so that the web of material to be measured may pass through this portion of the cabinet.

A counter shaft 53 is supported by bearings 54 and 55 with its axis substantially parallel to the side walls 11 and 12 of the cabinet. The counter shaft 53 is provided with a sprocket or pulley 56 which is connected to the gear reduction output sprocket 37 by a chain indicated by the broken line 57. The shaft 53 is provided intermediate its ends with an overrunning clutch 59 which is so arranged that the counter shaft portion 60 rotates only in one direction and remains stationary when the remainder of the counter shaft 53 is rotating in a reverse direction. The counter shaft portion 60 is supported by the bearings 54 and 61 and supports a pair of axially spaced double pulleys 62 thereupon. A similarly spaced pair of pulleys 64 are mounted upon a parallel shaft 65 and the pulleys on the two shafts are connected by conveyor belts 66. These belts 66 form the top portion of an endless conveyor extending transversely across the front of the cabinet. The shaft 65 is supported by suitable bearings 67 mounted on the cabinet wall 44.

As is perhaps best illustrated in FIGURE 2 of the drawings, a foot lever 69 is pivotally connected at 70 to a pivot bracket 71 mounted upon the cross member 25. The foot lever 69 is shown as being channel-shaped in cross section and includes an angularly formed end portion 72 mounted on the outer end of the lever. The lever 69 extends through a slot or notch 73 in the lower edge of the cover member 40 so as to project from the cabinet. A lug 74 projects upwardly from a portion of the lever which is within the cabinet, this lug 74 being straddled by the bifurcated lower end 75 of a clevis 76 and a pivot 77 connects the clevis to the lug. A connecting rod 79 is attached to the clevis 76 and extends through the cross member 22 for support thereby. As indicated in FIGURE 1 of the drawings, the upper end of the rod 79 is attached to a similar clevis 80 which is pivotally attached by a pivot 81 to a lug 82 projecting downwardly from a platform 83. Thus, movement of the foot lever 69 functions to raise and lower the platform 83.

A pair of parallel vertical stub shafts 84 are anchored to hubs 85 mounted upon the cross member 22 and these stub shafts 84 extend through bearing sleeves 86 extending through the platform 83. Springs 87 encircle the portions of the stub shafts 84 located between the hubs 85 and the lower ends of the sleeves 86, these springs 87 acting to hold the platform 83 in an elevated position.

A pair of spaced bearings 89 are mounted on one end of the platform 83 to support a conveyor shaft 90 parallel to the previously described shafts 60 and 65. A similar pair of bearings 91 are mounted at the opposite end of the platform 83 to support a shaft 88, one such bearing 91 being illustrated in FIGURE 1 of the drawings. Spaced pulleys 92 are provided on the shaft 90 and similar pulleys 93 are provided on the shaft 88. The pulleys 92 and 93 support belts 94, the upper reaches of these belts being substantially in surface contact with the lower reaches of the belt 66 when the apparatus is in operation without any web being carried between the upper conveyor formed by the belt 66 and the lower conveyor formed by the belts 94. While the two conveyors may separate due to compression of the springs 87, they are normally urged together by these springs.

A pair of channel shaped frame members 95 and 96 extend transversely of the cabinet, the rear frame member 95 being secured closely adjacent the cabinet rear wall 17 and partially attached thereto and the other channel 96 being parallel to the front panel 40 but spaced rearwardly a short distance therefrom. One end of each of the frame members 95 and 96 is secured closely adjacent the side wall 11 and the other ends thereof terminate short of the opposite side wall 12. A frame member 97 which is also shown as being channel shaped in form connects these other ends of the frame members 95 and 96 and forms a support therefor.

A pair of slide rods 99 and 100 which are parallel to the front and rear walls of the cabinet have one end secured at 101 to the frame member 97 and extend through apertures in the side wall 11 for support at their opposite ends. The rods 99 and 100 support a carriage 102 which includes a pair of rectangular blocks 103 and 104 slidably supported on the rods 99 and 100 respectively, the blocks 103 and 104 being connected by a series of parallel rods 105. The position of the carriage 102 may be adjusted by means of an operating handle 106 which is pivotally connected at 107 to lugs 109 upon the slide block 104. As indicated in FIGURE 4 of the drawings, the handle 106 extends through an aperture 110 in the cover member 40 for manual engagement exteriorly of the cabinet. The aperture 110 is transversely elongated and is provided in its lower edge with a series of notches 111 which are spaced apart a distance equal to the spacing between the carriage bars 105 for a purpose which will be later described.

An externally threaded screw 112 is rotatably supported by bearings 113 and 114 respectively on the frame members 95 and 96. A sprocket or pulley 115 is connected by the connecting chain or belt 116 to the gear reduction output pulley 39. Thus, the shaft 112 is rotated in unison with the counter shaft 53 when the drive motor 26 is in operation.

Figure 5:
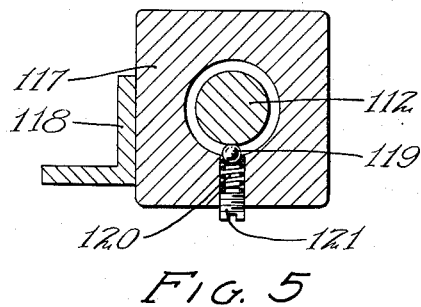
FIGURE 5 is a sectional view through the traveling block or carriage which moves longitudinally of the threaded shaft.

The threaded shaft 112 carries a block 117 which is held from rotation by the member 118 and which is movable along the threaded shaft 112 upon rotation of this shaft. As is indicated in FIGURE 5 of the drawings, a ball bearing 119 is urged against the surface of the exteriorly threaded shaft 112 by a spring 120 held in place by the set screw 121. This ball bearing rides in the thread of the shaft 112 and causes axial movement of the block upon rotation of the shaft 112.

Figure 7:
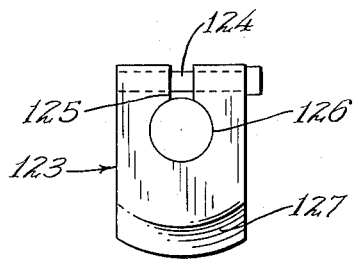
FIGURE 7 is an elevational view of a detail portion of the apparatus.

The block 117 carries a switch 122 which is successively engageable with a series of lugs or stops 123 adjustably positioned upon the rods 105. While these stops 123 are not shown in great detail, they are provided with a mounting aperture extending therethrough and the upper end of each stop is slit so that the stop may be clamped in an adjusted position by a set screw 124. As indicated in FIGURE 7, the set screw 124 connects the portion of the stops on opposite sides of the slit 125 which communicates with the rod aperture 126. The lower ends of the lugs 123 are preferably rounded as indicated and are tapered as is also indicated at 127.

As will be evident from the drawings, the switch 122 is provided with an actuating member topped by a roller 129 which engages the tapered lower edge of each stop 123 and is actuated thereby. The switch 122 is of the normally closed type and actuation thereof opens the circuit in a manner which will be later described in conjunction with the description of the wiring diagram.

The block 117 also carries a switch 130 which is engageable with an adjustable stop 131. The slide block 103 is provided with a depending plate 132 having a series of laterally spaced apertures therethrough, the apertures being spaced apart a distance equal to the spacing of the rods 105. The stop 131 normally comprises an externally threaded rod which is held in adjusted relation to the plate by means of nuts 133. As will be later described, the stop 131 comprises a means of reversing the operating motor 26 to return the block 117 to a starting position.

As is perhaps best illustrated in FIGURE 1 of the drawings, an angle bracket 134 is mounted on the side of the block 117 and acts to adjustably support an angular plate 135 extending upwardly therefrom. An angle bracket 136 is secured to the frame member 97 and acts to support a switch 137 which is in the path of movement of the plate 135. The switch 137 is in the path of movement of the angle bracket 136 and is at the return end or starting end of the threaded shaft 112.

The carriage 102 is adjusted laterally on its slide rods 99 and 100 by use of the operating handle 106 pivotally supported thereon. The notches 111 in which the handle 106 engage are spaced apart distances equal to the spacing of the rods 105, and when the handle 106 is engaged in the left hand notch 111 of the series as in FIGURE 4 of the drawings, the carriage 102 is in its extreme left hand position as illustrated in FIGURE 1, with the switch 122 supported to successively engage lugs or stops 123 on the rod 105 nearest the right hand side of the carriage as viewed in FIGURE 1. By pivoting the forwardly projecting end of the handle 106 upwardly to release it from the end notch 111, and by moving the handle 106 to the right, the carriage 102 may be moved to register the handle with any of the other notches 111. This action moves the lugs or stops 123 of any of the rods 105 into path of movement of the switch 122. The carriage is held in adjusted position by dropping the handle 106 into the selected notch 111.

By spacing the lugs or stops 123 of each rod 105 at different intervals, the web may be moved proportional distances before coming to a stop. Thus the lugs or stops 123 of each rod 105 may be preset to move the web predetermined distances between stops.

Figure 6:
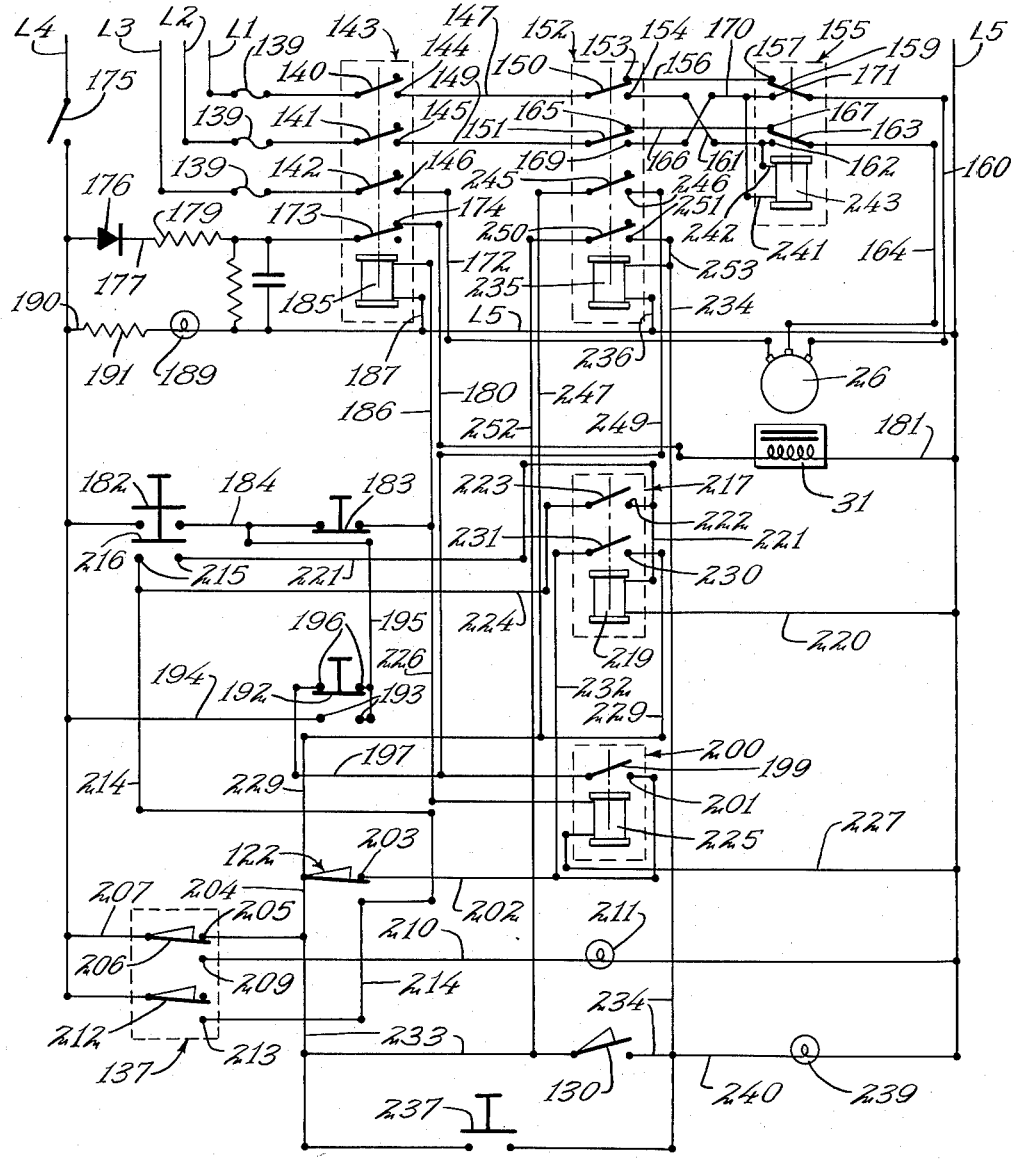
FIGURE 6 is a wiring diagram of the apparatus.

FIGURE 6 of the drawings shows the wiring diagram of the complete apparatus. The diagram illustrates two circuits entering the apparatus in order to operate the three phase motor and to operate the remaining apparatus. Obviously, both of these lines may be a part of the current from a single source. The motor operating line wires are indicated at L1, L2 and L3. These lines extend through fuses 139 to armatures 140, 141 and 142 of a four pole relay 143. The armatures 140, 141 and 142 are normally in circuit opening position and upon actuation of the relay the armatures close the circuit to fixed contacts 144, 145 and 146 respectively. The fixed contacts 144 and 145 are connected by conductors 147 and 149 to a pair of armatures 150 and 151 of a second relay 152. The relay 152 is of a four pole double throw type. The armature 150 is selectively engageable with fixed contacts 153 and 154 both of which are connected to fixed contacts of a third relay 155 which is of the double pole double throw type. Contact 153 is connected by a conductor 156 to the fixed contact 157 of a first armature 159 of the relay 155, the armature 159 being connected by a conductor 160 to one of the three terminals of the motor 26. The fixed contact 154 of the relay 152 is connected by a conductor 161 to a normally open fixed contact 162 of the second armature 163 of the relay 155. The armature 163 is connected by a conductor 164 to a second terminal of the motor 26. The normally closed fixed contact 165 of the relay armature 151 is connected by a conductor 166 to the normally closed contact 167 of the second armature 163 of relay 155. The normally open fixed contact 169 engageable with the relay armature 151 is connected by a conductor 170 to the normally open fixed contact 171 of the armature 159 of the relay 155. The third fixed contact 146 of the first relay 143 is directly connected by a conductor 172 to the third terminal of the motor 26.

This arrangement is such that when the first relay 143 is actuated to close the three armatures 140, 141 and 142 thereof, current from the line wires is conducted through the normally closed contacts of the relays 152 and 155 to the rotor 26 to operate this motor in one direction. When the two relays 152 and 155 are energized so as to close the various normally open contacts thereon, the current through the conductors 160 and 164 will be reversed so as to operate the motor 26 in the opposite direction.

The first relay 143 also includes a fourth armature 173 which is normally in circuit closing position with a fixed terminal 174. The second of the circuits mentioned includes line wires indicated as L4 and L5. A switch 175 controls the current through the line wire L4 to which is connected a rectifier 176. A conductor 177 connects the output of the rectifier 176 to the relay armature 173 through a suitable voltage dropping resistor 179. The fixed normally closed contact 174 is connected by a conductor 180 to one terminal of the magnetic brake 31, the other terminal of which is connected by a conductor 181 to the line wire L5 to complete the circuit. Thus, when the machine is in operation, and the first relay 143 is in the position illustrated to open the contacts to the motor 26, the brake 31 is energized to hold the motor shaft stationary. However, when the relay 143 is energized, the circuits to the motor 26 are closed and the circuit to the brake 31 is opened, thus permitting the motor to operate without interference by the brake.

The relay 143 may be energized by a circuit extending from the line wire L4 through a normally open starting switch 182 and a normally closed switch 183 which are arranged in series in a conductor 184. The switch 182 forms a starting switch by means of which the circuit may be closed and the switch 183 forms a stop switch which may be operated to stop the motor. The motor starting and stopping switches 182 and 183 are mounted in any convenient location on the machine, usually in conjunction with the jogging switch 192. The switch 183 is connected to the relay coil 185 of relay 143 by a conductor 186. The other terminal of the coil 185 is connected by a conductor 187 to a portion of the line wire L5.

An indicating light 189 is connected in series in a conductor 190 with a voltage dropping resistor 191 so as to provide a visible indication when the switch 175 is closed.

A jog switch 192 is arranged in parallel with the starting switch 182. The switch 192 includes normally open contacts 193 one of which is connected by a conductor 194 to line wire L4 and the other of which is connected by a conductor 195 to the conductor 184 at a point between the starting switch 182 and the stop switch 183. When the jog switch 192 is engaged with the contacts 193, the relay coil 185 will be energized in the manner previously described. The jog switch 192 is also provided with normally closed terminals 196 normally bridged by the switch member 192, one of the terminals 196 being connected to the conductor 195. The other of the terminals 196 is connected by a conductor 197 to the armature 199 of a fourth relay 200. The relay 200 is of the single pole single throw type and is normally open. When closed, the armature 199 engages a fixed contact 201 connected by a conductor 202 to the normally closed fixed contact 203 of the cam operated switch 122, which switch may be opened by any of the cams or lugs 123 by movement of the block 117 longitudinally of the threaded shaft 112. The second terminal of the switch 122 is connected by a conductor 204 to the normally closed fixed contact 205 of the switch 137 which acts as a limit switch when the block 117 is in starting position. The switch 137 includes two armatures which are movable in unison, the first armature or switch blade 206 being engageable with the fixed contact 205 and being connected by the conductor 207 to the line wire L4.

The switch blade 206 is also engageable with a normally open fixed contact 209 which is connected by a conductor 210 to the line wire L5 through an indicating light 211 which provides an indication when the block 117 is in its starting position. The limit switch 137 also includes a second switch blade 212 connected to the line wire L4. The blade 212 engages a normally open fixed contact 213 when the two blades 206 and 212 are operated upon the return of the block 117 to starting position. The fixed terminal 213 is connected by a conductor 214 to one of a pair of normally open contacts 215 which may be bridged by a switch 216 which is movable in unison with the starting switch 182 and forms a part of the starting switch. The switch blade 212 is adjusted so it moves into its circuit closing position somewhat before the connected blade 206 upon return of the block 117 to its starting position for a purpose which will be later described.

A fifth relay 217 is actuated by a relay coil 219 one terminal of which is connected to the line wire L5 by a conductor 220. The other terminal of the coil 219 is connected by a conductor 221 to the second of the two normally open contacts 215. Thus, when the starting switch is closed, a circuit will be closed from line wire L4 through the switch blade 212, conductor 214, switch 216 and conductor 221 leading to the coil 219, the other terminal of which is connected to the other side of the line by the conductor 220. The fifth relay 217 incorporates a holding circuit which includes a fixed terminal 222 connected to the conductor 221, an armature 223 which is normally in circuit opening position relative to the terminal 222, and a conductor 224 leading to the conductor 214. In other words, the relay switch 222, 223 is in parallel with the switch 216, and holds this circuit closed after the starting switch portion 216 is opened, as long as the limit switch blade 212 of the limit switch 137 is in circuit closing position. The relay coil 225 of the fourth relay 200 is normally energized during operation of the motor 26, one terminal of the coil 225 being connected by a conductor 226 to the conductor 186 and conductor 184 leading through the stop switch 183 and starting switch 182. As these conductors are connected through the switches to the line wire L4 and as the other terminal of the relay coil 225 is connected by a conductor 227 to line wire L5, the relay 200 acts as a holding relay for maintaining the motor circuit closed until either the switch 122 or the switch 206 is opened or until the resetting switch 130 is actuated.

In further explanation of the fifth relay 217, this relay also includes a holding circuit which is closed as long as the normally open circuit through the switch blade 212 of the limit switch 137 is closed. As was previously described, the switch blade 212 is actuated somewhat prior to the actuation of the blade 206 and as a result the switch blade 212 will also remain closed until shortly after the blade 206 has engaged its normally closed contact 205. The holding circuit includes a conductor 229 leading from this normally closed contact 205 to a fixed terminal 230 which is engaged by the relay armature 231 when the coil 219 is energized. The armature 231 is connected by a conductor 232 to the conductor 202 of the holding circuit for the coil 185 of the first relay 143. Thus, when the limit switch blade 206 is in closed position and when the holding relay 200 is energized to maintain the circuit to the motor actuating relay 143 the line wire L4 is connected to the holding circuit through the armature 231 of relay 217.

The reversal of the motor to return the block 117 to its starting position is effected by the resetting switch 130 mounted on the movable block and operable at the end of the forward travel of the block 117. This switch is normally open and has one terminal connected by a conductor 233 to the conductor 207 through the limit switch blade 206 which of course is always closed unless the block 117 is in starting position. The other terminal of this switch 130 is connected by a conductor 234 to one terminal of the relay coil 235 of the second relay 152. The other terminal of this coil is connected by a conductor 236 to the line wire L5, completing the circuit. A manually operable switch 237 is arranged in parallel to the switch 130 so that the resetting of the block to its starting position may be accomplished manually at any point of the cycle of operation. A light 239 is arranged in a conductor 240 leading from the conductor 234 to the line wire L5 so as to provide a visible indication when the resetting switch 130 or the manual switch 237 is closed.

The closing of the second relay 152 results in the closing of the third relay 155 through conductors 241 and 242 which are connected to the normally open contacts 154 and 169 of the second relay 152 and which are connected to the terminals of the relay coil 243 which actuate the third relay 155. Thus when the relay 152 is actuated, two of the three lines to the motor 26 are reversed, causing the motor 26 to operate in the opposite direction.

The second relay 152 includes a third normally open switch including an armature 245 and a fixed contact 246, one of which is connected by the conductor 247 to the conductor 229 leading to the limit switch terminal 205 and the other of which is connected by a conductor 249 to the conductor 197 between the holding switch relay 200 and the jog switch 192. As a result, actuation of the cam switch 122 is ineffective to stop the motor by deenergizing relay 143 during return movement of the block 117. The relay 152 also includes a fourth switch including the armature 250 and the fixed contact 251, one of which is connected by a conductor 252 to one side of the reset switch 130 and the other of which is connected by conductor 253 to the other side of the resetting switch 130. It should be noted that the fixed contact 251 is connected to the conductor 234 leading to the relay coil 235 of the relay 152 and thus, when the relay is closed, a holding circuit is provided which maintains the relay energized after the resetting switch 130 or 237 is opened.

In the operation of the circuit, operation of the starting switch 182 closes a circuit to the first relay 143 and also to the fourth relay 200. Energization of the first relay 143 releases the power applied to the brake 31 and energizes the motor 26, operating this motor in a manner to drive the conveyor belts and to move the block 117 from its starting position.

As soon as the block 117 starts its movement, the limit switch blade 206 of the limit switch 137 closes and current from the line wire L4 flows through the limit switch blade 206, the cam operated switch 122, the holding relay armature 199 of the relay 200, jog switch 192, and stop switch 183. As a precautionary measure, and in order to insure the continuance of operation of the motor 26 after the starting switch is released, the auxiliary portion 216 of the starting switch closes a circuit to the fifth relay 217, acting through the armature 231 of the relay 217 to maintain the circuit to the motor operating relay 143 until the leaf 212 of the limit switch 137 breaks contact.

The motor 26 continues to operate until the switch 122 engages and is opened by the first of the series of stops 123 which are in its path. The opening of the switch 122 breaks the circuit to the coil 225 of the holding relay 200 thereby deenergizing relays 143 and 200. This stops the motor 26 and applies current to the brake 31 to stop rotation of the motor shaft. After the desired operation has been accomplished on the web, the starting switch 182 is again closed, once again energizing the relay coils of relays 143 and 200. Simultaneously, the portion 206 of the starting switch closes a circuit to the fifth relay 217, energizing this relay and closing the circuit through the relay armature 231 which is in parallel with the cam operated switch 122. This circuit is maintained as long as the cam switch is in its normally open position and relay 217 is deenergized when the cam switch 122 is disengaged from its stop and returns to normally closed position. It will be seen that the relay 217 is merely a safeguard against the premature release of the starting switch button before the limit switch or the cam operated switch has moved to normally closed position.

This operation continues until the block 117 reaches the end of its stroke. At this time, the reset switch 130 is actuated by engagement thereof with one of the adjustably supported stops 131. The closing of the switch 130 acts to energize the second relay 152 which in turn actuates the third relay 155. The energization of the relays 152 and 155 serve to reverse the current to the motor 26, thereby operating the motor in a reverse direction. The holding circuit incorporated in relay 152 maintains the relays 152 and 155 energized until the limit switch 137 is actuated by the return of the block 117 to starting position. At the same time, the relay armature 245 closes a circuit in parallel to the cam switch 122 so that actuation of this cam by movement of the block 117 in a reverse direction will not open the motor circuit operating relay.

In accordance with the patent statutes, I have described the principles of construction and operation of my improvement in measuring devices, and while I have endeavored to set forth the best embodiments thereof, I desire to have it understood that changes may be made within the scope of the following claims without departing from the spirit of my invention.

I claim:

1. A measuring device for conveying a web and stopping movement thereof at predetermined positions including a web conveyor, a reversible drive means connected to said conveyor for driving the same in one direction, a threaded shaft connected to said drive means for actuation thereby in either direction, a carriage, means supporting said carriage for movement transversely of the axis of said threaded shaft, a member on said threaded shaft and movable longitudinally thereof upon rotation of said shaft, a series of stop supports on said carriage in parallel relation to said shaft, a series of stops adjustably supported by said stop supports, a switch carried by said member successively engageable with the stops of one stop support upon rotation of said shaft in one direction, and means holding said carriage in an adjusted position with the stops of any of said stop supports in the path of movement of said switch, whereby actuation of said drive means in one direction will move said conveyor and simultaneously move said member and the switch thereupon for successive engagement with the stops on a selected stop support.

2. The structure of claim 1 and including an overrunning clutch in the connection between said drive means and said conveyor.

3. The structure of claim 1 and in which said drive means is electrically operated, and including a power circuit connected to said drive means and including said switch, said switch being normally closed and being opened by engagement with said stops.

4. The structure of claim 1 and including a brake connected to said drive means and operable to stop rotation of said drive means when said drive means is de-energized.

5. A measuring device for conveying a web and stopping movement thereof at predetermined positions including a web conveyor, a reversible drive means connected to said conveyor for driving the same in one direction, a threaded shaft connected to said drive means for actuation thereby in either direction, a carriage, means supporting said carriage for movement transversely of the axis of said threaded shaft, a member on said threaded shaft and movable longitudinally thereof upon rotation of said shaft, a series of stop supports on said carriage in parallel relation to said shaft, a series of stops adjustably supported by said stop supports, a switch carried by said member successively engageable with the stops of one stop support upon rotation of said shaft in one direction, and means holding said carriage in an adjusted position with the stops of any of said stop supports in the path of movement of said switch, said drive means being electrically operated, a power circuit connected to said drive means and including said switch, said switch being normally closed and being opened by engagement with said stops, a normally open starting switch connected in parallel with said first named switch and operable to close the circuit when said first switch is open.

6. The structure of claim 5 and including an electrically operable brake connected to said drive means and connected in parallel with said drive means, said brake being released when energized.

7. A measuring apparatus for conveying a web predetermined distances, the apparatus including a web conveyor, a reversible driving means, means connecting said driving means and said conveyor for moving said conveyor in one direction only, a movable member, means supporting said movable member for movement between two extreme positions, a carriage mounted for movement transversely of the direction of movement of said movable member, a series of supports secured to said carriage in parallel relation to the direction of movement of said movable member, means supporting said carriage with any selected support adjacent the path of movement of said movable member, cooperable means on said supports when in said adjacent position and on said movable member operable when engaged to stop said reversible driving means upon movement of said movable member in one direction, means on said movable member cooperable with fixed means in one extreme position of said movable member to reverse said driving means and move said movable member in a reverse direction, and means rendering said cooperable means on said supports and on said movable member inoperable to stop said driving means during reverse movement of said movable means.

8. The structure of claim 7 and including means on said movable member and cooperable fixed means engageable when said movable member reaches its other extreme position to stop said driving means.

9. The structure of claim 7 and in which said cooperable means on said supports and on said movable member includes switch means.

10. A measuring device for conveying a web and stopping movement thereof at predetermined positions including a web conveyor, a reversible drive means connected to said conveyor for driving the same in one direction, a member slidably supported and connected to said drive means for reversible movement thereby, a carriage, means supporting said carriage for movement transversely of the direction of slidable movement of said carriage, a series of stop supports on said carriage in parallel relation to the direction of movement of said member, a series of stops adjustably supported on said stop supports, cooperable stop means on said member and said stop supports successively engageable upon movement of said member along said stop supports to stop movement of said member, and means holding said carriage in an adjusted position with the stops of any one of said stop supports in the path of movement of said cooperable stop means, whereby actuation of said drive means in one direction will move said conveyor and simultaneously move said member for successive engagement with the cooperable means on a selected stop support.

References Cited in the file of this patent

UNITED STATES PATENTS

| | | |
|---|---|---|
| 1,349,995 | Wurts et al. | Aug. 17, 1920 |
| 1,600,992 | Neidich | Sept. 28, 1926 |
| 2,397,339 | Crosby | Mar. 26, 1946 |
| 2,763,064 | Bondy | Sept. 18, 1956 |
| 2,852,629 | Sacher | Sept. 16, 1958 |